Patented June 18, 1940

2,204,969

UNITED STATES PATENT OFFICE 2,204,969

SEPARATION OF ORGANIC SULPHONATES

Joseph Henry Percy, New York, N. Y., assignor to Colgate-Palmolive-Peet Company, Jersey City, N. J., a corporation of Delaware No Drawing. Application June 23, 1939, Serial No. 280,812

22 Claims. (Cl. 260—504)

This invention relates to a method of purifying sulphonation products and more particularly to a method of removing sulphonating agent from sulphonated materials. It is an object of this invention to recover economically organic sulphonic acids from mixtures containing such materials and an excess of unreacted sulphonating agent.

In the past, it has been the general practice to dilute the reaction products of organic materials and sulphonating agents with water with or without other agents in order to separate the composition into a plurality of immiscible layers in which the organic sulphonates and the excess sulphonating agent appear in different layers. Although this method facilitates the removal of a part of the excess sulphonating agent from the organic sulphonate product, it is unsatisfactory in that an insufficient proportion of spent sulphonating agent is removed. In order to remove further quantities of spent sulphonating agent, it is common practice to wash the sulphonic acid layer with concentrated solutions of sodium chloride. Since solutions of sodium chloride of the concentration desired have a specific gravity substantially the same as that of the aqueous solution of acids, separation of the two layers is hindered and a strong tendency toward emulsification appears. Because of the relatively uniform solubility of sodium chloride at various temperatures, it is not practical to overcome this difficulty by attempting to increase the concentration of the sodium chloride by raising the temperatures. Furthermore, it has been found that the sodium chloride solution is appreciably soluble in the organic sulphonic acid solution.

The use of sodium sulphate has also been suggested, but even more serious difficulties are encountered with this substance. It has been found that with particular organic sulphonates the solutions of sodium sulphate, sulphuric acid, sodium bisulphate formed in situ, and organic sulphonic acids are compatible, and no useful separation of layers is obtained. Possibly this may be due in part to a matter of salt interchange between the organic sulphonic acid and the sodium sulphate to form some sodium salts of the organic sulphonates which have an appreciable solubilizing effect on the sulphuric acid, sodium sulphate, and sodium bisulphate formed in situ. Furthermore, when separation is obtained with certain of the organic sulphonates, by means of aqueous sodium sulphate solutions, it is relatively poor, and appreciable amounts of sulphuric acid, sodium sulphate and/or sodium bisulphate are left with the organic sulphonic acid. Another material factor in the use of sufficient sodium sulphate to cause separation with certain of the organic sulphonates is the higher cost of this material over the readily available sodium chloride. The use of sodium bisulphate solutions presents similar difficulties and in addition if any separation of layers is obtained, the appreciable quantity of sodium bisulphate which is retained in the sulphonic acid layer requires considerable alkali to neutralize, hence the process is not of material benefit.

It has now been found that substantially thorough and complete separation of the excess sulphonating agent from the organic sulphonic acids can be readily effected by treatment of the concentrated aqueous solutions thereof preferably at temperatures not greater than 70° C. with a solution containing an alkali halide, which solution has a specific gravity greater than 1.21 compared with water at the same temperature, and particularly with relatively concentrated aqueous solutions of sodium chloride which also contain sufficient alkali metal, ammonium or other alkali sulphates, bisulphates, phosphates, bromides, and/or halides other than sodium chloride to raise the specific gravity of the extracting solution above 1.21 with respect to water at the same temperature.

The method may be conducted by contacting an aqueous solution of organic sulphonic acids also containing sulphuric acid or the like with a relatively concentrated sodium chloride solution containing sufficient sodium acid sulphate to raise the specific gravity of the solution substantially above 1.21 at 20° C. The mixed salt solution will extract the major portion of the sulphuric acid thus leaving a purer solution of organic sulphonate. The washing step is usually repeated several times in order to obtain greater working efficiency or continuous countercurrent washing advantageously may be employed. Great economies are effected by this method of removing sulphuric acid over the prior art methods of neutralizing and separating the inorganic salts from the organic sulphonate salts. Because of salt interchange between the organic sulphonic acids and the inorganic salts employed in the washing solution, a portion of the organic sulphonic acids are neutralized thus effecting further savings in the quantity of alkali required to neutralize the sulphonic acids in the subsequent steps in the process of preparing detergent salts.

The process is adapted to either batch or continuous procedure. In the case of batch washing the two solutions can be contacted by mixing in a suitable manner, or the relatively concentrated mixed salt solution can be sprayed over the surface of the batch of sulphonic acid solution and the mixing or washing is effected by the gravity flow of the salt solution through the sulphonic acid solution. If desired, these methods may be combined. Too violent agitation should not be used since this causes some frothing and may cause emulsification to take place.

In the continuous procedure, countercurrent washing is effected in a column with or without packing. In a vertical column the sulphonate solution is introduced near the bottom of the column and drawn off at the top whereas the denser mixed salt solution is introduced near the top and drawn off at the bottom. A constant rate of flow is preferably controlled by automatic regulation so that a condition of substantial equilibrium is obtained in the column. The time of contact of the solutions may be fixed by the length of the column, packing, and rate of flow of the individual solutions. Any acid-resisting packing such as glass, clay, porcelain, or metal, may be employed for the column in the form of wool, Raschig rings, beads, or other conventional shapes.

The aqueous solution containing the inorganic salts and inorganic acids may be heated in a suitable apparatus to recover the acids or their anhydrides which may be collected individually, e. g., as hydrochloric acid, hydrobromic acid and sulphur trioxide and leaving a salt or a mixture of salts which may be re-used for the washing of additional sulphonic acid solutions.

The following specific examples are illustrative of the present invention but are not intended to be limiting on the scope thereof.

Example I

The product of the reaction between 10 parts by weight liquid sulphur dioxide extract of a Texas Gulf Coast crude fraction in an equal volume of liquid sulphur dioxide and 10 parts by weight of 20% oleum in an equal volume of liquid sulphur dioxide, is diluted with about 14 parts by weight of water, and a large part of the sulphur dioxide removed as a gas. An aqueous sulphuric acid layer containing about 3 parts of the oleum as sulphuric acid is separated. The remaining solution of sulphonic and sulphuric acids is washed 3 times with a fresh aqueous salt solution containing about 16.4% sodium chloride and about 12.9% sodium acid sulphate and having a specific gravity of about 1.25 at 20° C. The total volume of salt solution is approximately equal to that of the sulphonic-sulphuric acid mixture. The washing is accomplished by slowly spraying the salt solution heated to approximately 70° C. over the surface of the sulphonic-sulphuric acid mixture at about 25° C. by means of a cross-shaped perforated pipe which is continuously rotated during the spraying. The sulphonic-sulphuric acid mixture is held in a tank with a cone-shaped bottom for ease of separation of the aqueous salt solution which settles to the bottom. No agitation is applied to the sulphonic acids in order to avoid emulsification, etc. The lower aqueous layer is drawn off after about one hour in the first two washes and after about twelve hours in the third wash. Approximately 3.5 additional parts of sulphuric acid are conveniently removed by this washing step.

Example II

The sulphonic-sulphuric acid mixture obtained as described in Example I by the limited dilution with water of the sulphonation-reaction products is continuously washed countercurrently in a cylindrical tower, packed with Raschig rings, with a little greater than an equal volume of an aqueous salt solution containing about 15.5% sodium chloride and 17.9% sodium acid sulphate and having a specific gravity of about 1.31 at 20° C. This washing also removed about 3.5 parts of sulphuric acid.

Example III 30 parts by volume of the sulphonic-sulphuric acid mixture obtained as described in Example I by the dilution with water of the sulphonation reaction products are mixed with 30 parts by volume of a solution containing 12.2% sodium acid sulphate and 20.5% sodium chloride and having a specific gravity of about 1.26 at 20° C. After permitting the solutions to stand for about 90 minutes, the aqueous layer is separated. This procedure for washing the acid product is repeated three times. The total acidity of the acid product is reduced about 75% by this treatment.

Example IV

The procedure of Example III is repeated but substituting a solution containing 29% sodium acid sulphate and 13% sodium chloride and having a specific gravity of about 1.36 at 20° C. for the salt solution in that example. The acidity of the solution is reduced about 69%.

Although the above examples are directed to the treatment of sulphonated mineral oil extract, it is also possible to similarly treat other organic sulphonates containing sulphuric acid or the like. Other sulphonated materials which may be similarly treated include mineral oil acid sludge, aromatic sulphonic acids including benzene, toluene, naphthalene, naphthene, anthracene and diphenyl sulphonic acids and the alkylated derivatives thereof, long-chain alkyl sulphonic acids, sulphonated fatty acids and esters thereof including sulphoacetic acid esters, sulphonated castor oil and sulphonated oleic acid, sulphonated polyhydric aliphatic compounds and the partial ethers and esters thereof, long-chain alkyl sulphates including acid sulphates of the long-chain alcohols obtained from coconut oil by hydrogenation, sulphates of polyhydric aliphatic compounds, and the partial ethers and esters thereof, long-chain fatty acid esters of taurine, long-chain fatty acid esters of isethionic acid as well as the hydroxy, amino, halogeno-, aryl, alkyl, acyl and like derivatives thereof.

Other salts which may be employed generally in conjunction with sodium chloride include sodium acid sulphate, sodium sulphate, sodium bromide, potassium chloride, potassium bromide, ammonium chloride, ammonium acid sulphate, sodium sulphite, sodium acid sulphite, sodium ammonium phosphate, primary, secondary and tertiary sodium orthophosphate, or various combinations thereof. In the case of sulphates or phosphates, these materials should not be used in excess of that which will combine with the sulphuric acid present to form sodium acid sulphate or phosphoric acid respectively. In the latter case a mixture of phosphoric acid and sodium acid sulphate is apparently the result.

The following chart shows the solubility curve of sodium chloride and sodium acid sulphate in water at 23° C.

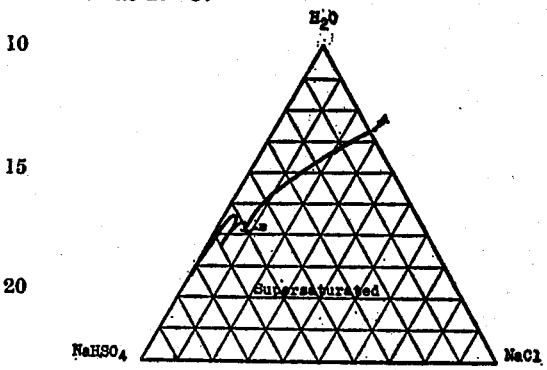

From this chart it can readily be seen, much higher concentrations of salt, which give a correspondingly higher specific gravity, may be obtained by using sodium acid sulphate in conjunction with sodium chloride than may be obtained by sodium chloride per se. It is apparent from this curve that the percentage of sodium chloride in the solution is reduced with increasing percentages of sodium acid sulphate but the total salt content is raised thereby. Additions of either salt to such a solution at any point along this curve A—B causes deposition of sodium chloride. The curve A—B represents the operating range of solutions preferred for the present purposes. Beyond the point B the efficiencies of the concentrated washing solution are not as high as those obtained from concentrated solutions represented by the curve A—B. Furthermore, small changes in sodium chloride content of the solution in this range may cause the crystallization of large quantities of sodium acid sulphate from said solution with consequent operating difficulties. The preferred range of sodium acid sulphate in saturated mixed salt solutions of this type is between 5% and 40%.

It should be noted that if other materials than sulphuric acid are used as the sulphonating agent such as chlorsulphonic acid and the like, they will probably be converted to sulphuric acid when diluted with water during the present process of separation. If the solution of the sulphonic-sulphuric acid mixture is relatively dilute, dry salt may be added to the solution or a combination of dry salt and a concentrated solution of the salt or even a supersaturated solution of the salts may be employed. If non-dissolved salts are added to the sulphonic acid solution, it is preferred to add the more soluble salt or salts since it is relatively difficult to dissolve these materials in such a solution. The aqueous dilution step previous to the salt solution wash may be omitted, but suitable adjustment of the salt solution must be made so that when equilibrium is established the salt solution has a specific gravity greater than 1.21 as compared with water at the same temperature.

Although it is not necessary, other materials may be present during one or more stages of the washing step such as organic and inorganic solvents including liquid sulphur dioxide, dioxane, monoglycerides, isobutyric acid, ethyl, propyl and butyl alcohols, acetone, ethyl ether, dichlorodiethylether, chloroform, excess mineral oil extract, petroleum ether, butane, and the like. The oxygen containing solvents such as ethyl ether, alcohols, acetone and the like, are particularly effective for causing better separation of the salt solution from the sulphonic acid solution.

As many different embodiments of this invention may be made without departing from the spirit and scope thereof, it is to be understood that the invention is not to be limited to the specific proportions or embodiments disclosed except as defined by the following claims.

I claim:

1. A process of separating sulphonating agent from organic sulphonates which comprises admixing, in the presence of water, a composition containing a sulphonating agent and an acid organic sulphonate, with an inorganic salt composition comprising an alkali metal halide in such proportions so that an aqueous salt solution separates, having a specific gravity greater than 1.21 as compared with water at the same temperature.

2. A process of separating sulphonating agent from organic sulphonates which comprises admixing, in the presence of water and an organic liquid, a composition containing a sulphonating agent and an acid organic sulphonate, with an inorganic salt composition comprising an alkali metal halide in such proportions so that an aqueous salt solution separates, having a specific gravity greater than 1.21 as compared with water at the same temperature.

3. A process of separating sulphonating agents from organic sulphonates which comprises adding to a mixture of an acid organic sulphonate and a spent sulphonating agent, an aqueous solution containing an alkali metal halide and having a specific gravity greater than 1.21 as compared with water at the same temperature.

4. A process of separating sulphonating agents from organic sulphonates which comprises adding to a mixture of an acid organic sulphonate and a sulphonating agent, an aqueous solution containing an alkali metal halide and having a specific gravity greater than 1.21 as compared with water at the same temperature and a small quantity of an organic liquid.

5. A process of separating sulphonating agents from organic sulphonates which comprises adding to a mixture of an acid organic sulphonate and a sulphonating agent, an aqueous solution containing an alkali metal halide and at least one other salt and having a specific gravity greater than 1.21 as compared with water at the same temperature.

6. A process of separating sulphonating agents from organic sulphonates which comprises adding to a mixture of an acid organic sulphonate and a sulphonating agent, an aqueous solution containing an alkali metal halide and an alkali acid sulphate and having a specific gravity greater than 1.21 as compared with water at the same temperature.

7. A process of separating sulphonating agents from organic sulphonates which comprises adding to a mixture of an acid organic sulphonate and a sulphonating agent, an aqueous solution containing sodium chloride and having a specific gravity greater than 1.21 as compared with water at the same temperature.

8. A process of reducing the acidity of solutions of sulphonic acids which comprises treating a mixture of sulphuric acid and an organic sulphonic acid with an aqueous salt solution containing an alkali metal halide and having a specific gravity greater than 1.21 as compared with water at the same temperature thereby removing sulphuric acid and in part neutralizing the organic sulphonic acids.

9. A process of separating sulphonating agents from organic sulphonates which comprises adding to a mixture of an acid organic sulphonate and a sulphonating agent, a concentrated aqueous solution containing sodium chloride and sodium acid sulphate.

10. A process of separating sulphonating agents from organic sulphonates which comprises adding to a mixture of an acid organic sulphonate and spent sulphonating agent, an aqueous solution containing sodium chloride and sodium acid sulphate and having a specific gravity greater than 1.21 as compared with water at the same temperature and a small quantity of an organic oxygen-containing liquid.

11. A process of separating sulphonating agents from organic sulphonates which comprises adding to a mixture of an acid organic sulphonate and a sulphonating agent, a concentrated aqueous solution containing sodium chloride and sodium acid sulphate and a small quantity of an organic oxygen-containing liquid.

12. A process of separating sulphonating agents from sulphonic acids of aromatic mineral oil extracts sulphonated in liquid sulphur dioxide which comprises treating a mixture of sulphuric acid and a sulphonic acid of an aromatic mineral oil extract sulphonated in liquid sulphur dioxide with an aqueous salt solution containing an alkali metal halide and having a specific gravity greater than 1.21 as compared with water at the same temperature.

13. The process of separating sulphonating agents from aromatic mineral oil extract sulphonic acids which comprises treating a mixture of a sulphonating agent and an aromatic mineral oil extract sulphonic acid with an aqueous salt solution containing an alkali metal halide and having a specific gravity greater than 1.21 as compared with water at the same temperature.

14. A process for separating sulphonating agents from aromatic sulphonic acids which comprises treating a mixture of a sulphonating agent and an alkylated aromatic sulphonic acid with an aqueous salt solution containing an alkali metal halide and having a specific gravity greater than 1.21 as compared with water at the same temperature.

15. A process for separating sulphonating agents from aromatic sulphonic acids which comprises treating a mixture of a sulphonating agent and an aromatic sulphonic acid with an aqueous salt solution containing an alkali metal halide and having a specific gravity greater than 1.21 as compared with water at the same temperature.

16. A process for separating sulphonating agents from organic acid sulphates which comprises treating a mixture of sulphuric acid and an organic acid sulphate with an aqueous salt solution containing an alkali metal halide and having a specific gravity greater than 1.21 as compared with water at the same temperature.

17. A process for separating sulphonating agents from sulphonic acids of aromatic mineral oil extracts sulphonated in liquid sulphur dioxide which comprises treating a mixture of sulphuric acid and a sulphonic acid of an aromatic mineral oil extract sulphonated in liquid sulphur dioxide with a concentrated aqueous salt solution containing sodium chloride and sodium acid sulphate.

18. A process for separating sulphonating agents from sulphonic acids of aromatic mineral oil extracts sulphonated in liquid sulphur dioxide which comprises treating a mixture of sulphuric acid and a sulphonic acid of an aromatic mineral oil extract sulphonated in liquid sulphur dioxide with a concentrated aqueous salt solution containing sodium chloride and sodium acid sulphate and a small quantity of an organic oxygen-containing liquid.

19. A process for separating sulphonating agents from aromatic sulphonic acids which comprises treating a mixture of a sulphonating agent and an aromatic sulphonic acid with a concentrated aqueous salt solution containing sodium chloride and sodium acid sulphate.

20. A process of separating sulphonating agents from organic sulphonates which comprises adding to a mixture containing an acid organic sulphonate and a sulphonating agent, an aqueous solution containing an alkali halide of the class consisting of alkali metal halides and ammonium halides, and having a specific gravity greater than 1.21 as compared with water at the same temperature.

21. A process of separating sulphonating agents from organic sulphonates which comprises adding to a mixture containing an acid organic sulphonate and a sulphonating agent, an organic oxygen-containing solvent and an aqueous solution containing an alkali halide of the class consisting of alkali metal halides and ammonium halides, and having a specific gravity greater than 1.21 as compared with water at the same temperature.

22. A process of separating sulphonating agents from organic sulphonates which comprises adding to a mixture containing an acid organic sulphonate and a sulphonating agent, an alcohol and an aqueous solution containing an alkali halide of the class consisting of alkali metal halides and ammonium halides, and having a specific gravity greater than 1.21 as compared with water at the same temperature.

JOSEPH HENRY PERCY.